This invention relates to electrical subassemblies and more particularly to a subassembly which may be used as a direct replacement for a thyratron tube.

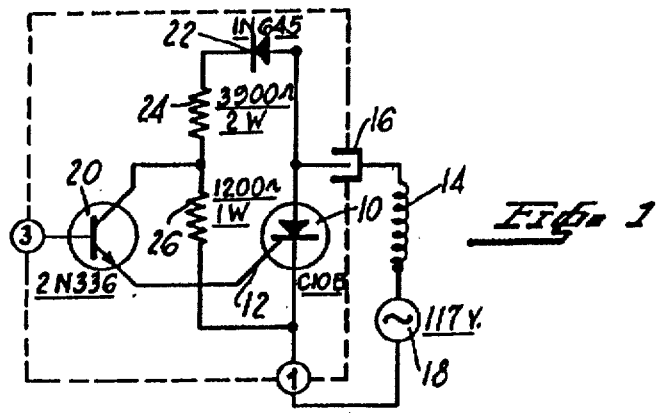
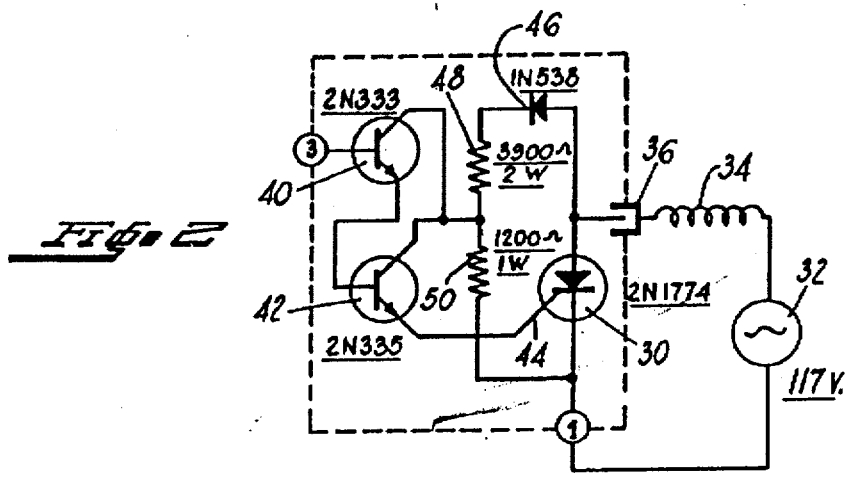
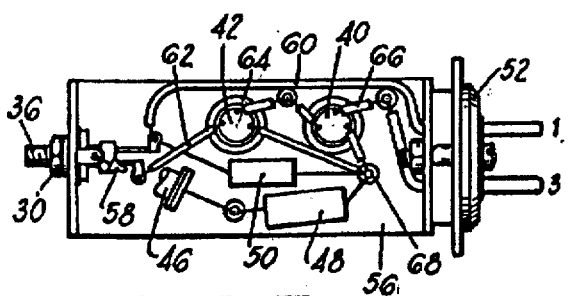
JAY H. STOUDENMIRE
JOHN W. NASH
INVENTORS 3,179,814
ELECTRICAL SUBASSEMBLY
Jay H. Stoudenmire and John W. Nash, Baltimore, Md., assignors to The Bendix Corporation, Baltimore, Md., a corporation of Delaware
Filed June 29, 1962, Ser. No. 206,259
1 Claim. (Cl. 307—88.5)

For many years thyratron tubes have been used as a source of controlled power for controlling the operation of an electric motor. Typically, one such tube may be used to control each direction of rotation of said motor. Inasmuch as such thyratron tubes are often connected directly to the motor winding, some considerable amount of power may be required. It has been observed that where the thyratrons are supplied in quantity for use with systems where they must operate, not as off-on switching devices, but as proportional control devices, the rejection rate has been excessively high. In such proportional controls the phase of the grid voltage is typically varied with respect to the anode voltage to control the proportion of the half-cycle of anode voltage during which anode current will flow. The average anode current thus varies with the phase of the input voltage. If the grid voltage at which firing takes place varies, is not consistent, the average anode current will not bear the proper relationship to the phase of grid voltage. Yet such variations typically occur in high production thyratron tubes, making quality control difficult and, in some cases, forcing an expensive selecting process to assure satisfactory operation. A further weakness of the typical glass thyratron tube is its lack of resistance to mechanical shock and vibration. This limits its use where severe environmental conditions are to be expected. It is, therefore, an object of the present invention to provide a replacement unit for a typical thyratron tube having much greater accuracy as a phase controlled power amplifier than does the standard thyratron tube.

It is another object of the present invention to provide a replacement unit for a thyratron tube having much greater resistance to mechanical shock and vibration than do such thyratron tubes.

It is another object of the present invention to provide a replacement unit for a thyratron tube which has considerably greater uniformity in production and hence, higher reliability, than such thyratron tubes.

It is a further object of the present invention to provide a replacement unit for a thyratron tube in which solid state devices are used and which is capable of supplying substantial amounts of power to an output device.

It is a further object of the present invention to provide a replacement unit for a thyratron using a silicon controlled rectifier which meets the above objects and which does not require the usual inhibiting devices for avoiding excessive power dissipation during the part of the power cycle when the anode is negative and the gate positive.

Other objects and advantages will become apparent from the following specification taken in connection with the accompanying drawings in which:

FIG. 1 is a schematic drawing showing the circuit arrangement of one embodiment of our invention.

FIG. 2 is a schematic drawing showing the circuit arrangement of another embodiment of our invention.

FIG. 3 is a plan view of typical plug-in unit incorporating the circuitry of FIG. 2.

Referring now to FIG. 1, a PNPN silicon controlled lized to switch the load current on and off in accordance with control signals supplied to its gate electrode 12. The load, as shown in this case, consists of a motor winding 14 which is connected to the anode of rectifying device 10 through a connector 16 which is positioned similarly to a terminal on the top of the replaced thyratron tube, as will appear more clearly from FIG. 3, and to a 117 volt A.C. source 18. The opposite terminal of the power source 18 is connected to the cathode terminal of rectifying device 10, through a connecting pin which corresponds to pin 1 of the replaced thyratron. A transistor 20 which may be a silicon transistor of the type 2N336, manufactured by the General Electric Co. is used to amplify the control signals supplied to the base of transistor 20 through pin 3, to the level required for reliable gating action of the controlled rectifier 10. Collector voltage for the transistor 20 is taken from the controlled rectifier anode supply through a silicon rectifier 22, which may be of the type 1N645. A pair of resistors 24 and 26, which may be 3900 ohms and 1200 ohms, respectively, serve to reduce the peak collector supply voltage below the maximum collector-to-emitter breakdown rating of the transistor 20. The half-wave rectifier 22 in the collector supply for transistor 20 is poled for conduction in the same direction as the controlled rectifier and hence prevents the appearance of a current at the gate 12 when inverse potential is applied to the anode. Gate current occurring during application of reverse bias to the rectifier anode causes undesirable power dissipation in the rectifier which may result in thermal runaway.

In deriving the voltage supply for the collector of transistor 20 directly from the anode supply for the controlled rectifier 10, an average direct current of the order of 10 milliamperes is caused to flow through the external load. In the present application the external load is the motor winding 14 which normally draws 800 milliamperes so the collector current becomes too small to have any detrimental effect on system performance.

A second embodiment of our invention is shown in FIG. 2. This arrangement is very similar to that of FIG. 1 except that an additional transistor amplifier stage is incorporated, making this unit useful where the input signal supplied is at such a low level that a single stage of amplification is not sufficient to assure reliable gating action. In the embodiment of FIG. 2 the controlled rectifier 30 is supplied with anode voltage from a 117 volt alternating current source 32. A motor winding 34 is connected between said source and the anode of rectifier 30 through an "anode cap" connector 36.

A transistor 40, which may be of a type 2N333 manufactured by the General Electric Co., receives at its base an alternating current signal varying in phase relative to its collector voltage with variations in a sensed condition. This signal is amplified, and supplied to a transistor 42, which may be of a type 2N335 manufactured by the General Electric Co., where it is further amplified before being fed to the gate 44 of controlled rectifier 30. As in the FIG. 1 embodiment, the collector voltage is supplied from the controlled rectifier anode supply through a diode 46 which prevents the occurrence of a positive voltage on the gate of the controlled rectifier when its anode voltage is swinging negative. A pair of resistors 48 and 50 divide this anode voltage such that a proper collector voltage appears at the collectors of transistors 40 and 42.

Operation of the devices shown in FIGS. 1 and 2 is very similar and will be described with reference to FIG. 2. A 117 volt alternating current source 32 is connected across the motor winding 34 (load) and the silicon controlled rectifier 30. When the rectifier 30 is on the negaing the positive half-cycle the controlled rectifier 30 will conduct when a critical positive voltage is reached on the gate 44. The input to the base of transistor 40 in the particular application described is such that in the absence of contact information, it consists of a series of negative half-cycles which occur in synchronism with the positive half-cycles on the anode of the controlled rectifier 30, thus preventing conduction of the rectifier. Control information is reflected in a shifting of the phase of these negative half-cycles and the amount of shift controls the percentage of the positive half-cycle over which the controlled rectifier conducts. The operation of the controlled rectifier is thus essentially the same as that of the thyratron which it replaces, but because of differences in input characteristics additional means such as the transistors 40 and 42 are required to provide the proper input impedance to avoid loading the preceding stages and to raise the level of the gate control signal to assure proper and reliable operation of the controlled rectifier. Whether one or two stages of transistor amplification is required, is dependent upon the magnitude of the input signal.

FIG. 3 shows a plan view of a thyratron replacement unit with its cover removed incorporating the circuit of FIG. 2. A standard connecting unit 52 similar to that found on the thyratron to be replaced, and having connecting pins 54 which mate with the tube socket on the associated equipment has attached thereto a metal bracket 56 which forms a chassis for the circuit. The top connector 36 is directly connected with the controlled rectifier 30 and it will be observed that one wire 58 from the controlled rectifier 30 connects with the diode 46, another wire 60 connects with pin 1 of the connecting unit 52, and a third wire 62 connects with the emitter wire of transistor 42. This transistor is connected with transistor 40 and both of the transistors are attached to the bracket 56 by means of holders 64 and 66, respectively, which are of insulating material. The collectors of transistors 40 and 42 and resistors 48 and 50 are shown connected to a common junction at a terminal 68 which is insulated from the bracket 56. The opposite end of resistor 48 is connected to diode 46 and the opposite end of resistor 50 is effectively connected to the controlled rectifier 30. The bracket 56 and the components mounted thereon are all enclosed in a cylindrical cover, not shown. It will thus be observed that we have produced a circuit capable of acting as a direct replacement for a thyratron and which can easily be fabricated in a unit of approximately the same physical dimensions as the replaced thyratron tube.

We claim:

A control circuit capable of serving as a direct electrical replacement for a thyratron tube, comprising:
- a silicon controlled rectifier having anode, cathode and gate electrodes,
- an alternating current source,
- a load, said source, load, cathode and anode electrodes being connected in series for conduction of current from said source through said load and rectifier electrodes upon injection of triggering current through said rectifier gate electrode,
- a diode,
- a voltage divider connected in series with said diode, said diode and voltage divider being connected in parallel with said rectifier cathode and anode electrodes with said diode being poled for conduction of current in the same direction as said rectifier, and
- a transistor amplifier having collector, emitter and base electrodes, said collector being connected to a point on said voltage divider, said emitter being connected to said rectifier gate electrode, and said base being arranged to receive an external control voltage from means adapted to apply control voltage to a thyratron grid.

References Cited by the Examiner

UNITED STATES PATENTS

| | | | |
|---|---|---|---|
| 2,454,160 | 11/48 | Fredendall | 328—262 |
| 2,663,806 | 12/53 | Darlington | 307—88.5 |
| 3,084,338 | 4/63 | Mauer et al. | 307—88.5 |
| 3,088,191 | 5/63 | Breiling | 317—101 XR |
| 3,097,314 | 7/63 | Hassiman | 307—88.5 |

OTHER REFERENCES

Solid State Products, "Bulletin D420–02," December 1959 (page 27 relied on).

ARTHUR GAUSS, *Primary Examiner.*